June 10, 1941.  F. S. TUREK  2,245,098
METHOD OF MAKING METALLIC PHTHALOCYANINE COMPOUNDS
Filed Oct. 26, 1938
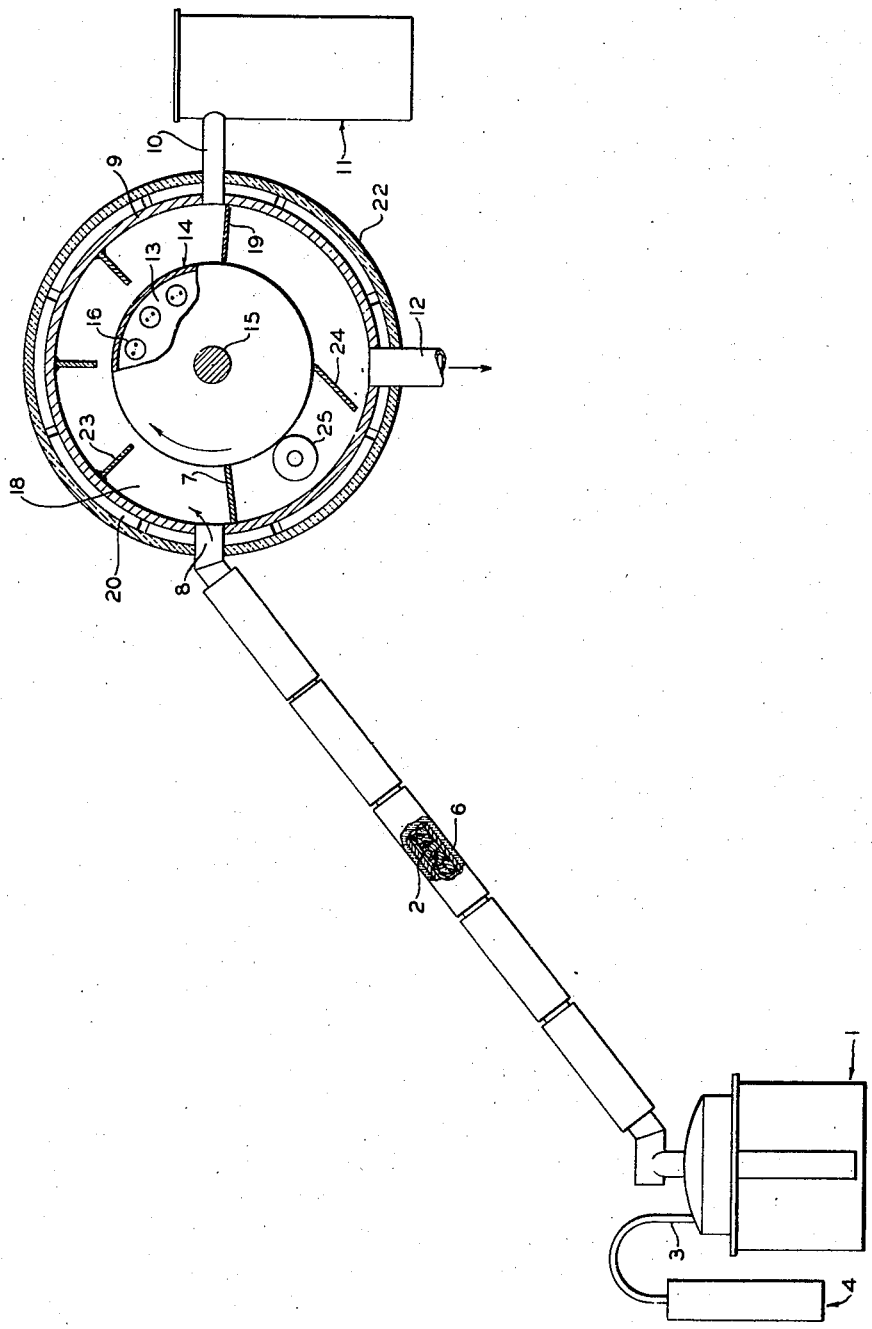
INVENTOR
FRANK S. TUREK
BY Milton Zucker
ATTORNEY Patented June 10, 1941

2,245,098

UNITED STATES PATENT OFFICE 2,245,098

METHOD OF MAKING METALLIC PHTHALO-CYANINE COMPOUNDS

Frank S. Turek, Yonkers, N. Y., assignor to Interchemical Corporation, New York, N. Y., a corporation of Ohio Application October 26, 1938, Serial No. 237,010

4 Claims. (Cl. 260—314)

This invention relates to the manufacture of phthalocyanine pigments, of the type which can be made by reacting aromatic dinitriles with metalliferous reactants such as metallic copper. More particularly, it relates to a method of reacting the vapors of an aromatic orthodinitrile with a metallic reactant.

The reaction between aromatic orthodinitriles and compounds which yield them, and metals, has been utilized in the preparation of a new group of pigments known as the phthalocyanines, the pigments being characterized by unusual resistance to both light and alkali, and a very pleasing color. In the past, such pigments have been prepared by fusing the dinitrile and heating the molten material with a finely divided metalliferous reactant, or by the treatment of the dinitriles, and of compounds which yield the dinitriles, with metalliferous reactants in the presence of solvents for the organic reactants. While very acceptable pigment has been produced by such methods, the cost of the pigment so produced has been so high as to discourage the widespread adoption merited by its excellent properties.

I have discovered a new method of preparing such pigments at a greatly reduced cost, which is based on my discovery that aromatic orthodinitrile vapors will react at elevated temperatures at metal surfaces to produce pigment. I have found, however, that this pigment coats the surface in a very thin film and stops further reaction. Such pigment, however, may be removed to present a clean surface for further reaction; and my method comprises the reaction of aromatic dinitrile vapors with metallic reactants at elevated temperatures while continuously removing the metallic pigments formed from the metal.

I have likewise found that the dinitrile vapors need not be pure, but that the products formed by reacting the vapors of an aromatic orthodiamide or an aromatic imide with ammonia, in the presence of a catalyst (the conventional method of preparing aromatic nitriles from aromatic acid amides, as discussed in Reid's translation of Sabatiers "Catalysis in Organic Chemistry," New York, 1923, at page 811) may be used successfully, and that the dinitrile formed may be removed almost quantitatively by reaction with the metal, while the imide and ammonia may be recovered.

A typical set-up which may be used for practicing my invention is shown in the accompanying diagram, in which 1 is a melting pot into which phthalamide or phthalimide may be charged and vaporized into a reaction tube 2. Anhydrous ammonia may be led in through an inlet pipe 3 from a tank 4, in the required amounts, and the mixture of ammonia and phthalamide vapor is passed through a catalyst mass 5, comprising infusorial earth, or one of the other conventional catalysts heretofore used, such as pumice, aluminum, etc., which completely fills the tube 2. The tube is preferably completely insulated by means of an insulating tube 6. The catalyst is pre-heated to about 350°–400° C., and maintained at that reaction temperature by electric strip heaters 7. Preferably, these heaters are arranged in a plurality of sections, each thermostatically controlled, in order to keep the heat uniform throughout the reaction tube. The gas stream at the discharge end 8 of the reaction chamber contains dinitrile, ammonia and unreacted imide. For the purposes of my process, it is immaterial whether the gas stream be of this composition, or whether it be substantially pure nitrile vapor.

The reaction chamber for the blue formation comprises an outer cylindrical stationary shell 9 provided with an inlet 8, a gas outlet 10, leading into a condenser 11, and a dump outlet 12. A polished metal cylinder, preferably comprising a base 13 and a covering 14, rotates inside the shell, on a shaft 15, in the direction shown by the arrow. This cylinder may be heated by electric cartridge heaters 16. A baffle 17, close to the entrance port completely shuts off the bottom of the reaction chamber 18 formed between the shell and the cylinder, while a second baffle 19 shuts off the chamber just below the gas outlet 10. The reaction chamber is heated by means of electric strip heaters 20, maintained in place by clamps 21 or other convenient heating means, and is preferably insulated by a covering 22. Baffles 23 may be attached to the outer shell to slow up the gases passing through the reaction chamber.

In the operation of the device, the cylinder 13—14 of polished metal is rotated slowly in a clockwise direction, and vapors containing nitrile are fed into the reaction chamber through the port 8, the chamber, and particularly the metal surface, having been previously heated to reaction temperature. A coating of pigment forms on the surface of the drum as it rotates and as the vapor carries along with it; the speed of the gas stream and the drum should be approximately equal, and should be such that reaction is substantially complete by the time the stream reaches the outlet port 10. The gas stream passes into the condenser 11, where unreacted nitrile, imide and ammonia may be recovered.

A scraper 24 removes the film of pigment from the drum and drops it into the dump outlet 12. One or more burnishing wheels 25 then polish the drum and remove the last traces of the pigment film so that the surface is again metallic and reactive.

In the operation of the process, I have used phthalonitrile, both pure and in a crude reaction mixture prepared from phthalamide, substituted phthalonitriles, naphthalonitrile, and similar materials. I have found that copper yields the most satisfactory results in this method, although tin, cadmium, and in general, any of the metals reactive with phthalonitrile in the prior art processes, may be used. A solid metal cylinder may be used; but I prefer to use the composite cylinder illustrated, and electroplate the metal onto the drum, as this provides a very reactive metal surface.

The temperature and time of reaction will vary depending on each other and on the reactants. Using copper and phthalonitrile vapors mixed with phthalimide and ammonia, I obtain substantially complete conversion by exposing the metal to the vapors for about one to two minutes when the metal is preheated to and maintained at 225°–300° C. In general, I prefer to maintain the metallic reaction surface in this temperature range, since decomposition of the finished pigment occurs above 300° C., resulting in lower yields and poorer color, while the reaction is slow and the gases are difficult to control below 225° C.

Although I have shown but one form of apparatus for practicing my invention, others may quite obviously be used without departing from the spirit of my invention.

What I claim is:

1. The method of making copper phthalocyanine which comprises heating a copper plate to a temperature of from 225° to 300° C., bringing said plate into contact with phthalonitrile vapor in the same temperature range, maintaining contact between the vapor and the plate at least until copper phthalocyanine is formed on the plate, separating the spent vapors from the pigment coated plate, removing the pigment from the plate, and re-exposing it to fresh vapor.

2. The method of claim 1, in which the contacting vapors are a crude reaction mixture containing dinitrile, acid imide, and ammonia.

3. The method of making copper phthalocyanine which comprises continuously contacting a stream of aromatic phthalonitrile vapors with a drum having a copper surface heated to reaction temperature, and rotating in the same direction as the vapor stream is moving, maintaining contact between the vapor stream and the drum until a coating of copper phthalocyanine is formed on the drum, separating the vapor stream, removing the copper phthalocyanine from the drum, and thereafter bringing the cleaned portion of the drum in contact with fresh vapor.

4. The method of making copper phthalocyanine pigment which comprises contacting the vapors of an aromatic ortho-dinitrile with the surface of a massive body having a copper surface at reaction temperatures, removing the deposit of pigment formed to reexpose the copper surface, and again contacting the copper surface with the vapors.

FRANK S. TUREK.